(12) United States Patent
Schurian et al.

(10) Patent No.: US 10,149,991 B2
(45) Date of Patent: Dec. 11, 2018

(54) ENERGY ABSORBER

(71) Applicant: Alexander Andrew, Inc., Compton, CA (US)

(72) Inventors: Cortland G. Schurian, Long Beach, CA (US); Michael Dancyger, Los Angeles, CA (US); Wayne Olson, Central Point, OR (US); Raymond Han, Fremont, CA (US)

(73) Assignee: Alexander Andrew, Inc., Compton, CA (US)

( * ) Notice: Subject to any disclaimer, the term of this patent is extended or adjusted under 35 U.S.C. 154(b) by 35 days.

(21) Appl. No.: 15/343,491

(22) Filed: Nov. 4, 2016

(65) Prior Publication Data

US 2017/0128756 A1  May 11, 2017

Related U.S. Application Data

(60) Provisional application No. 62/252,439, filed on Nov. 7, 2015.

(51) Int. Cl.
| | |
|---|---|
| *F16F 15/00* | (2006.01) |
| *A62B 35/04* | (2006.01) |
| *F16F 7/12* | (2006.01) |
| *F16F 13/00* | (2006.01) |

(52) U.S. Cl.
CPC .............. *A62B 35/04* (2013.01); *F16F 7/126* (2013.01); *F16F 13/005* (2013.01)

(58) Field of Classification Search
CPC ...... A62B 35/04; A62B 35/0056; F16F 7/126; F16F 13/005
USPC .......... 267/140.13, 69, 74, 293, 140.11, 178, 267/179
See application file for complete search history.

(56) References Cited

U.S. PATENT DOCUMENTS

| | | | | | |
|---|---|---|---|---|---|
| 2,421,822 A | * | 6/1947 | Wood | ........................ | F16L 3/16 |
| | | | | | 248/543 |
| 3,462,137 A | * | 8/1969 | Grube | ................... | B60P 7/0823 |
| | | | | | 267/177 |
| 3,610,606 A | * | 10/1971 | Andrews | ................. | F16F 15/02 |
| | | | | | 267/162 |
| 5,458,214 A | * | 10/1995 | Olson | ................ | A62B 35/0056 |
| | | | | | 182/18 |
| 9,498,659 B2 | * | 11/2016 | Schurian | ................ | A62B 35/04 |

* cited by examiner

*Primary Examiner* — Pamela Rodriguez

(57) ABSTRACT

An energy absorber includes a housing, a bearing housing positioned within the housing, a main connection point connected to a first receiver, and a threaded rod connected through a bearing and having an end connected to the first receiver at a first end of the housing. The bearing is positioned in the bearing housing. Compressible elements of the threaded rod compress against the bearing to absorb energy upon exceeding a force threshold.

18 Claims, 7 Drawing Sheets

ENERGY ABSORBER

CROSS-REFERENCE TO RELATED APPLICATIONS

This application claims the priority benefit of U.S. Provisional Patent Application Ser. No. 62/252,439, filed Nov. 7, 2015, incorporated herein by reference in its entirety.

BACKGROUND

Typical energy absorbers, particularly those used in fall protection system applications, are made using exposed metal part(s) that have to be replaced regularly due to detrimental environmental conditions (e.g., lightning strikes, rust, corrosion, exposure to hazardous chemicals, accidently damaged by other equipment, etc.). The replacement process for these typical energy absorbers takes time and replacement costs to the equipment owners.

When a webbing or a coiled piece of steel of typical energy absorbers dissipate or absorb energy, the materials are typically sheered apart and/or stretched, which means the product (be it a safety line system or a personal energy absorber) length is greatly increased. Testing performed on existing energy absorbers, coupled with existing absorber documentation shows that if properly used, many energy absorbers require as much as 54 inches to fully absorb the forces. This means more required clear fall distance that can be difficult to achieve or a big challenge in many work environments.

SUMMARY

Embodiments relate to absorption of energy, and more specifically to an energy absorption fall protection device or system that absorbs energy as compressible elements of a rod are compressed through a compression device. One embodiment includes an energy absorber having a housing, a bearing housing positioned within the housing, a main connection point connected to a first receiver, and a threaded rod connected through a bearing and having an end connected to the first receiver at a first end of the housing. The bearing is positioned in the bearing housing. Compressible elements of the threaded rod compress against the bearing to absorb energy upon exceeding a force threshold.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to an energy absorption fall protection device or system that absorbs energy as compressible elements of a rod are compressed through a compression device. One embodiment includes an energy absorber having a housing, a bearing housing positioned within the housing, a main connection point connected to a first receiver, and a threaded rod connected through a bearing and having an end connected to the first receiver at a first end of the housing. The bearing is positioned in the bearing housing. Compressible elements of the threaded rod compress against the bearing to absorb energy upon exceeding a force threshold One embodiment provides for the energy absorption of a system using connections between two members such as an anchor point or supporting structure and a safety line connected at each point. However the embodiments are not limited to full system applications and are adaptable to smaller personal types of fall protection energy absorbing products, which are designed to reduce the forces applied to an individual during a fall, thus preventing them from experiencing excessive forces.

One or more embodiments provide an energy absorbing device that uses the action of compressing compressible elements (e.g., threads on a bolt, welded or formed compressible elements on a rod, etc.) for absorbing energy. The compression of the compressible elements, for example, threads of a bolt, creates a very smooth and consistent absorption of energy, significantly reducing the forces applied to the human body or to the supporting members when subjected to force in excess of a threshold force (of resistance to the compression). The energy absorber may be an open or exposed construction or built in a sealed or semi-sealed housing and with an internal fall indicator and internal tension indicator.

Figure 1:
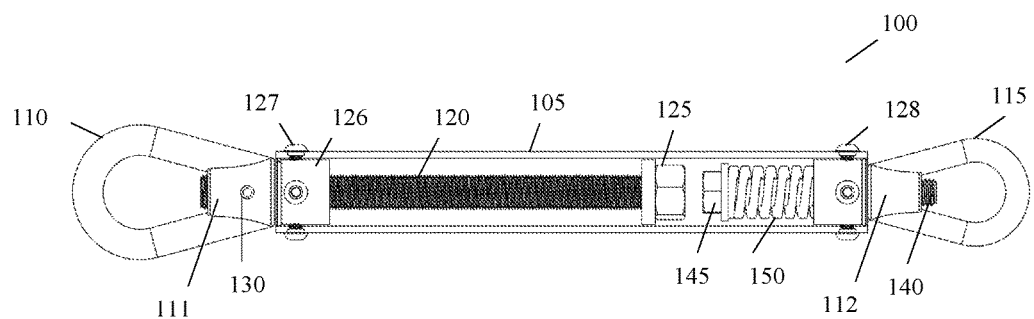
FIG. 1 shows an internal view of an energy absorber, according to an embodiment.

FIG. 1 shows an internal view of an energy absorber 100, according to an embodiment. In one embodiment, the energy absorber 100 includes a housing 105, a captive eye 110 (or main connection point) including a captive eye receiver 111, top attachment 115 including a top attachment receiver 112, threaded rod 120, rod cap nut 125, bearing (or compression device) housing 126, button cap fasteners 127, top cap fasteners 128, locking pin 130, tension rod 140, tension nut 145, and tension spring 150. In one embodiment, the energy absorber 100 housing 105 has an open face (as shown) to provide a view to the threaded rod 120 for inspection or an optional tension indicator element. In other embodiments, the energy absorber 100 housing 105 is closed, but provides a window 220 (FIG. 2) for internal inspection of the tension spring 150.

In one embodiment, the elements of the energy absorber 100 may be made of metal or metal alloy, for example zinc plated metal or metal alloys, galvanized or stainless steel, aluminum, etc. In other embodiments, the energy absorber 100 may include elements made with plastics as long as the compression of threads or other resistance points provide resistance to a desired threshold force.

In one embodiment, a bearing 210 (FIG. 2) including bearing balls, bearing rollers, etc. are seated in a groove 129 of the threaded rod 120 and are positioned within the bearing housing 126. The bearing 210 is pressed around the threaded rod 120. Depending on the strength of the material of the threads of the threaded rod 120, the bearing 210 resists movement of the threaded rod 120 from passing by the bearing 210 until a threshold force is reached. In one embodiment, the threshold force for a horizontal life line (HLL) application may be 1000-2000 pounds. For other applications, the threshold may be between 250-3500 pounds. In yet another embodiment, the threshold may be up to 20,000 pounds when used as a load indicator. Once the threshold force is reached, the threads of the threaded rod 120 compress (or crush) under the force one by one until the energy of the force is absorbed by the compression of the threads.

In one embodiment, as the threaded rod 120 is applied with a force that exceeds a threshold force (depending on the materials used for a desired threshold force), the threads are compressed and the threaded rod 120 passes by the bearing 210 and out through an end of the energy absorber 100 housing 105 connected to the captive eye 110. On the other end of the energy absorber 100, the tension spring 150 also compresses under a different threshold force which compresses the tension spring 150 and moved the top attachment 115 away from the end of the housing 105 near the top attachment 115 (see, e.g., FIGS. 7-8). In one embodiment, the threaded rod 120 may have gaps between multiple threads, additional shearing bolts/fasteners (e.g., that shear off when forced against the bearing 210, FIG. 2) positioned at portions of the threaded rod 120, etc. to customize resistance and energy absorption of a force acting on the threaded rod 120 from a force or fall event. In another embodiment, the threaded rod 120 is not a threaded bolt, but instead includes formed energy absorbing compressible elements (e.g., compressible raised welding points, molded compressible elements, etc.), where the formed compressible elements compress against the bearing 210 or some other compressing device or element (e.g., a cylinder, a compressing ring, etc.) to absorb energy.

Figure 2:
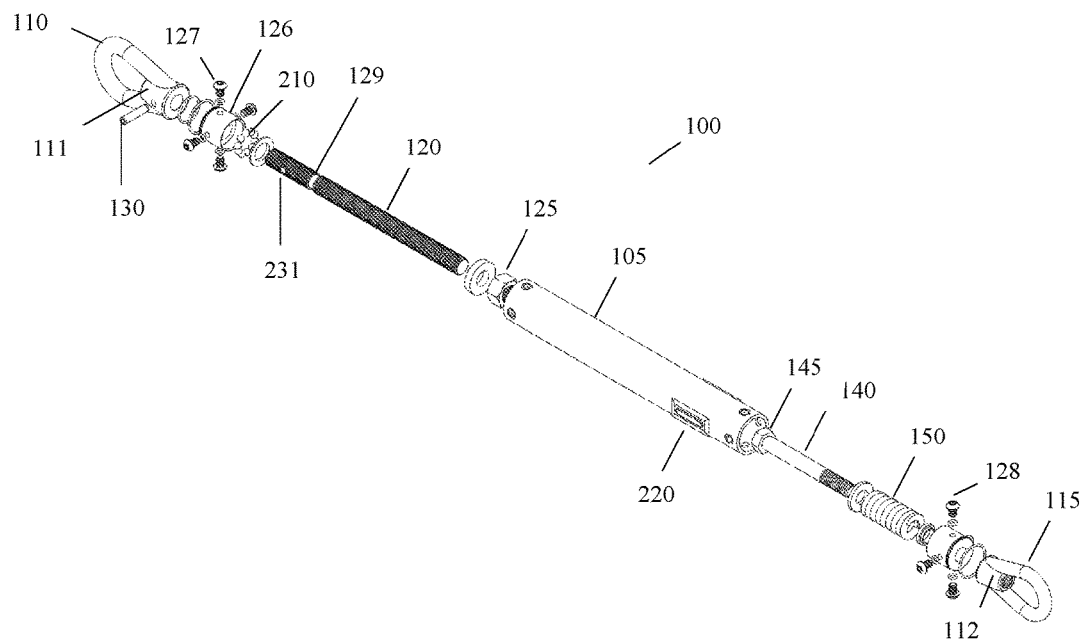
FIG. 2 shows an exploded view of an energy absorber, according to an embodiment.

FIG. 2 shows an exploded view of an energy absorber 100, according to an embodiment. In one embodiment, the threaded rod 120 includes a section of threads removed to form the groove 129 for positioning the bearing housing 126 with the bearing 210. In one embodiment, the threaded rod 120 includes an optional force or fall event indicator painted on the thread portion (e.g., color coded, solid color, etc.). The bearing housing 126 is a sleeve that contains the bearing 210 and keeps the bearing elements (e.g., bearing balls) in a fixed position in relationship to the threaded rod 120 so the bearing elements properly compress the threads as the threaded rod 120 is pulled through it due to a force exceeding a threshold resistance force between the bearing 210 and the threads of the threaded rod 120.

In one embodiment, the threaded rod 120 includes a slot or through-hole 231 to receive the locking pin 130 through the captive eye receiver 111 connecting the captive eye 110 to the threaded rod 120. In one embodiment, the tension rod 140 is a threaded bolt that attaches with the tension nut 145 (which may also be part of the tension rod 140 for a bolt application) on one end of the tension spring 150 and to the top attachment receiver 112 of the top attachment 115 on the other end. In one embodiment, the tension nut 145 (or bolt end) prevents the tension rod 140 from being completely pulled out of the housing 105 in the event of a fall.

In one embodiment, the housing 105 is made of a durable material (e.g., metal, metal alloy, hardened plastic, etc.) used to protect the internal energy absorber 100 components from the elements as well as acting as the back stop for the bearing housing 126. In one embodiment, the energy absorber 100 captive eye 110 is the main connection point for the energy absorber 100. In the event of a fall, force is applied to the captive eye 110 that is fixed to the threaded rod 120 by the captive eye receiver 111 (that is threaded) or an eye nut. In one example, as force is applied to the captive eye 110 the threaded rod 120 is being attempted to pull though the bearing housing 126, which is held in place by the housing 105. Upon a force being applied that exceeds the resistance from the threads of the threaded rod 120 against the bearing 210, the threads compress (or are crushed in) allowing the threaded rod 120 to pass through the bearing housing 126. The threads continue to be compressed (or crushed) one at a time, and if required, all the way until the rod cap nut 125 (and washer if used) is pressed against the bearing 210 retained by the bearing housing 126.

In one embodiment, o-rings may be placed against the bearing housing 126 and/or the top attachment receiver 112 to prevent contaminants from entering the housing 105 and affecting the function of the energy absorbing components. In one embodiment, the tension spring 150 is a high resistance tension spring used for creating a desired amount of resistance for the purpose of indicating when a safety line is properly tensioned (e.g., by use of a color coded indicator on the tension rod 140, a color coated tube placed over the tension rod 140, etc.). In one example, a washer is used to hold the tension spring 140 in place. In one example, the top attachment 115 may be replaced by other attachment means, such as welding instead of threading, a separate threaded nut, etc.

In one example, the energy absorber 100 may be attached to a d-ring of a safety vest or fall protection harness at one end, and the other end may be attached to a life-line. In one embodiment, the compression of a few inches of the threads of the energy absorber 100 threaded rod 120 provides necessary forces to absorb the energy of a fall and prevents "snapping" of the connection to a harness or safety vest.

In one or more embodiments, for the threaded rod 120, the thread gauge, bolt size and bolt material may be changed or altered to achieve different levels of energy absorption or to achieve the optimal desired effect. The rate of absorption may be adjusted by using a larger/smaller bearing housing 126, by using different sized bearing 210 components (e.g., bearing balls) or bearing 210 components (e.g., bearing balls, rollers, etc.) made from alternative materials (e.g., alloy, plastic resin, etc.) and varying hardness ratings. In one example, the threads of the threaded rod 120 may also be compressed or deformed by other means, such as using a threaded or partially thread nut, using a metal alloy or plastic resin plate, or by other means in which the thread shape is altered in the action of dragging a surface over the threads, deforming the threads, the dragged surface or a combination of both.

In one embodiment, the threaded rod 120 may have varying shapes based on the application. For example, the shape of the threaded rod 120 may be cylindrical, square, multi-faceted (e.g., an octagon, etc.), etc. The threaded rod 120 may be made from any material or shape that provides for crushing of threads or other elements formed on the threaded rod 120 (e.g., bumps, welded elements, formed elements, etc. The threads or other elements may be made of varying materials, depending on the applications, such as brass, aluminum, plastic, etc. In still other embodiments, any element on a rod or similar element that may be crushed or have its shape changed to absorb energy may be implemented by one or more embodiments.

In one embodiment, the functional elements of the energy absorber 100 may be fully exposed or they may be encased in a sealed or semi-sealed housing 105 for added security and absorption consistency following exposure to chemicals or environmental elements over time. In one embodiment, the threaded rod 12- or another part of the energy absorber may include a visual indicator (e.g., a red indicator as a warning) which becomes visible in the event of a fall or force event to notify the user that the product has been in an event and to alert them to remove the product from service or replace it.

In one embodiment, the captive eye 110 may be substituted with a webbing loop or a curved steel loop. The housing 105 may be made of a formed, extruded or molded steel, aluminum, plastic, textile or rubber material or can be completely replaced with a solid material wall made of formed, extruded or molded steel, aluminum, plastic rubber, etc. The bearing housing 126 with bearing 210 having bearing elements (e.g., bearing balls, bearing rollers, etc.) may be made of steel, aluminum or plastic or be completely replaced with a simple nut or series of nuts (e.g., the nut would replace the bearing housing 126 and the bearing balls assembly and function). The tension indicator element on the energy absorber 100 may be optionally included, depending on the demand of the system and the customer. The top attachment 115 may be optional in some embodiments. In one example, the top attachment 115 may be replaced with a webbing loop, a curved steel loop or completely removed so that the energy absorber 100 is directly attached or affixed to the structure or other parts of the personal fall arrest system by means of screw, welding or stitching.

Figure 3:
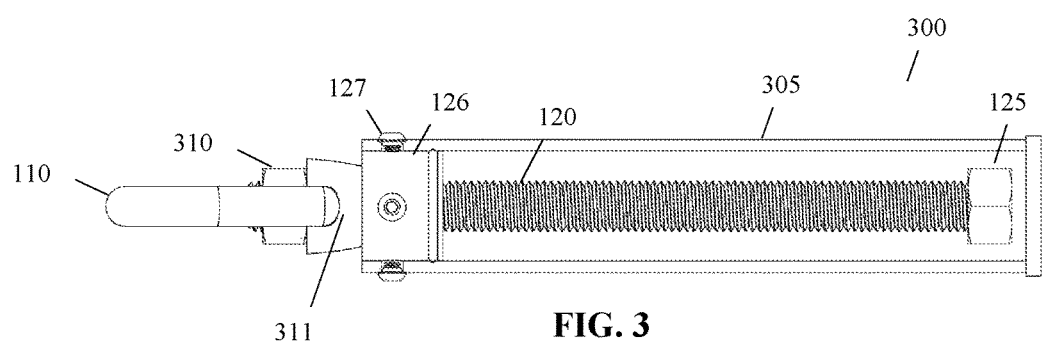
FIG. 3 shows an internal view of an energy absorption portion of an energy absorber, according to an embodiment.

FIG. 3 shows an internal view of an energy absorption portion 300 of an energy absorber, according to an embodiment. In one embodiment, the energy absorber includes a housing 305 that has an open end allowing the viewing of the threaded rod 120. The threaded rod 120 is attached with a nut 310 that is either separate or integrated with a captive eye receiver 311 of the captive eye 110.

Figure 4:
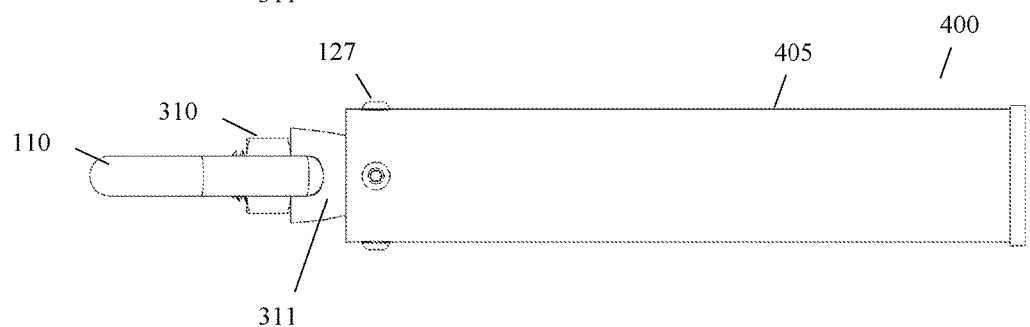
FIG. 4 shows a view of an energy absorption portion of an energy absorber with a closed housing, according to an embodiment.

FIG. 4 shows a view of an energy absorption portion 400 of an energy absorber with a closed housing 405, according to an embodiment. In one embodiment, the energy absorber includes the housing 305 that is closed protecting the threaded rod 120 and internal components from the elements. The threaded rod 120 is attached with a nut 310 that is either separate or integrated with a captive eye receiver 311 of the captive eye 110.

Figure 5:
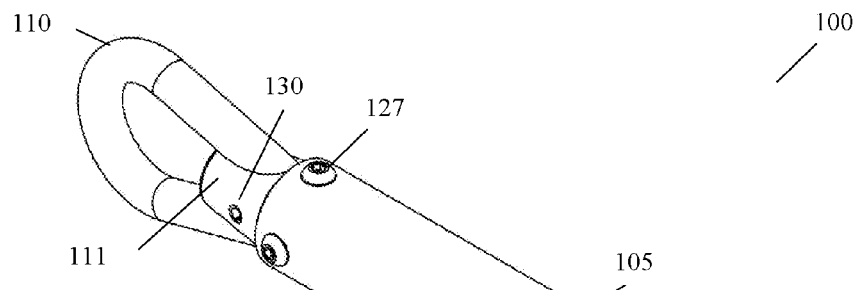
FIG. 5 shows a view of an energy absorber with a closed housing, according to an embodiment.
Figure 6:
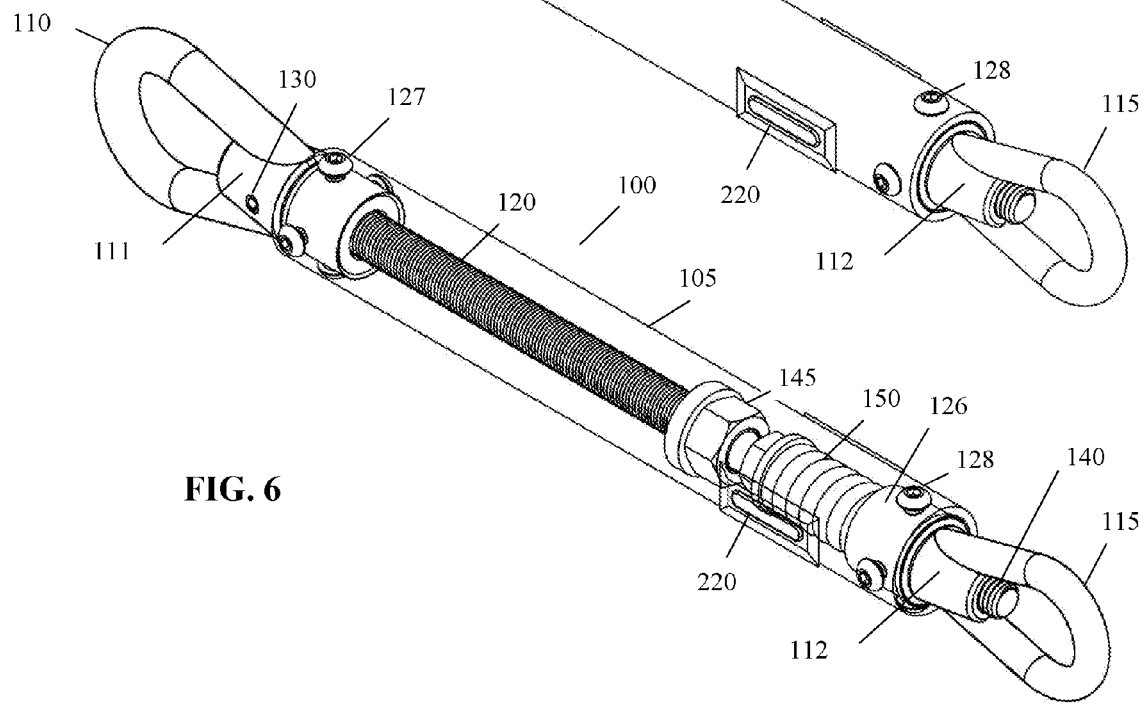
FIG. 6 shows a view of an energy absorber with an open housing, according to an embodiment.

FIG. 5 another view of the energy absorber 100, according to an embodiment. In one embodiment, the energy absorber 100 includes the housing 105 that is cylindrical in shape. In other embodiments, the housing 105 may have other shapes, such as rectangular, multi-faceted (e.g., pentagonal, octagonal, etc.). In one embodiment, the window(s) 220 provide or viewing the tension spring 150 and any indicator on or over the tension rod 140. FIG. 6 shows another internal view of the energy absorber 100, according to an embodiment.

Figures 7, 8:
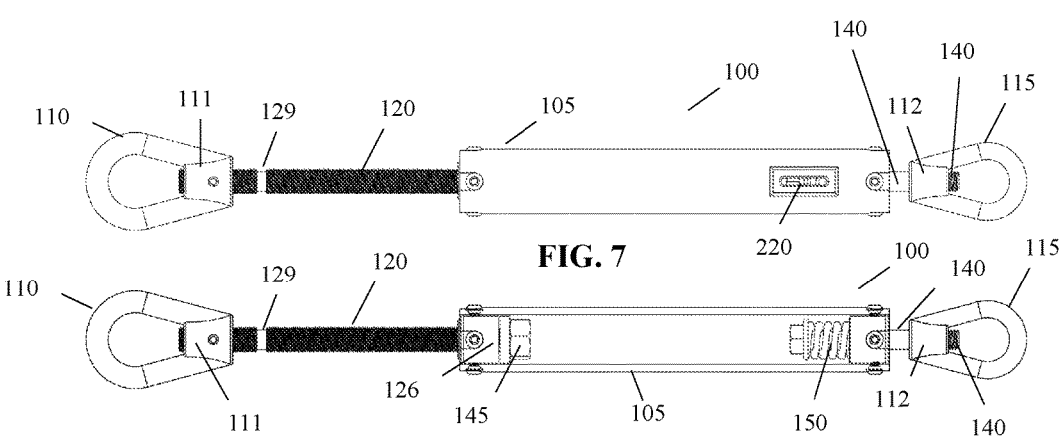
FIG. 7 shows a view of an energy absorber shown in a state with the energy absorption portion fully deployed and having a closed housing, according to an embodiment.
FIG. 8 shows a view of the energy absorber of FIG. 7 shown with an open sided housing, according to an embodiment.

FIG. 7 shows a view of an energy absorber 100 with a closed housing and shown in a state with the energy absorption portion fully deployed, according to an embodiment. In this example view, the energy absorber 100 includes a closed housing 105. The threaded rod 120 has been deployed outside or through the housing 105 based on the compression of the threads of the threaded rod 120 due to a force (e.g., from a fall event). As shown, the tension spring 150 has compressed with the top attachment 115 pulled outward from the housing 105 and showing a portion of the tension rod 140 now exposed from the housing 105.

FIG. 8 shows a view of the energy absorber of FIG. 7 shown with an open sided housing, according to an embodiment. In one example, the energy absorber 100 includes the housing 105 with an open inspection end that shows the internal view of the energy absorption elements.

Figure 9:
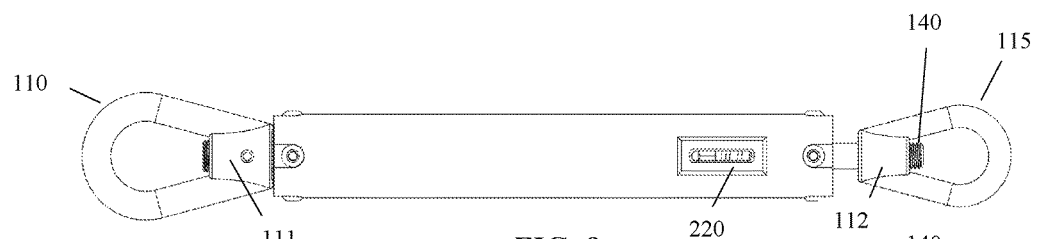
FIG. 9 shows a view of the energy absorber of FIG. 1 having a closed housing with the spring end deployed, according to one embodiment.
Figure 10:
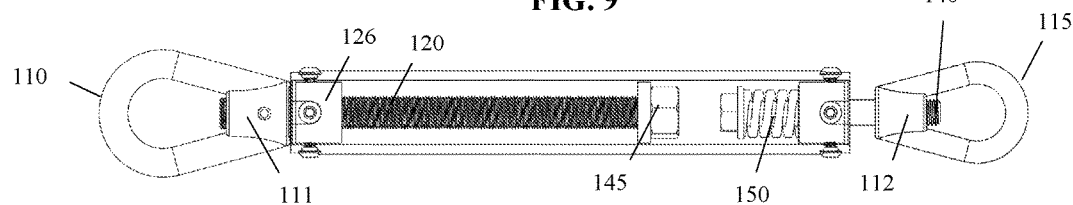
FIG. 10 shows a view of the energy absorber of FIG. 9 with an open sided housing, according to an embodiment.

FIG. 9 shows a view of the energy absorber of FIG. 1 with a closed housing and showing the tension spring 150 end deployed, according to one embodiment. In this example, the tension spring 150 is loaded with a force, but that force is not enough to cause compression of the threads of the threaded rod 120 from the bearing 210. FIG. 10 shows a view of the energy absorber of FIG. 9 shown with an open sided housing 105, according to an embodiment.

Figure 11:
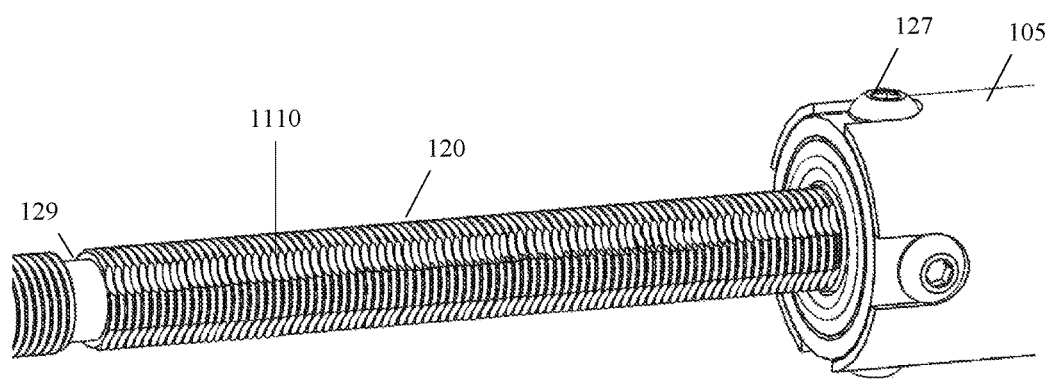
FIG. 11 shows damage from deployment of the energy absorber rod, according to an embodiment.

FIG. 11 shows damage 1110 from deployment of the energy absorber threaded rod 120, according to an embodiment. As shown, the energy absorber 100 in this example received a fall event having enough force to cause compression of the threads of the threaded rod 120. The bearing 210 (FIG. 2) elements (e.g., bearing balls, bearing rollers, etc.) are made of a stronger material than the threads, causing the threads to compress (crush) under the force and causing the threaded rod 120 to be pulled through the bearing 210 which results in the damage 1110.

Figure 12:
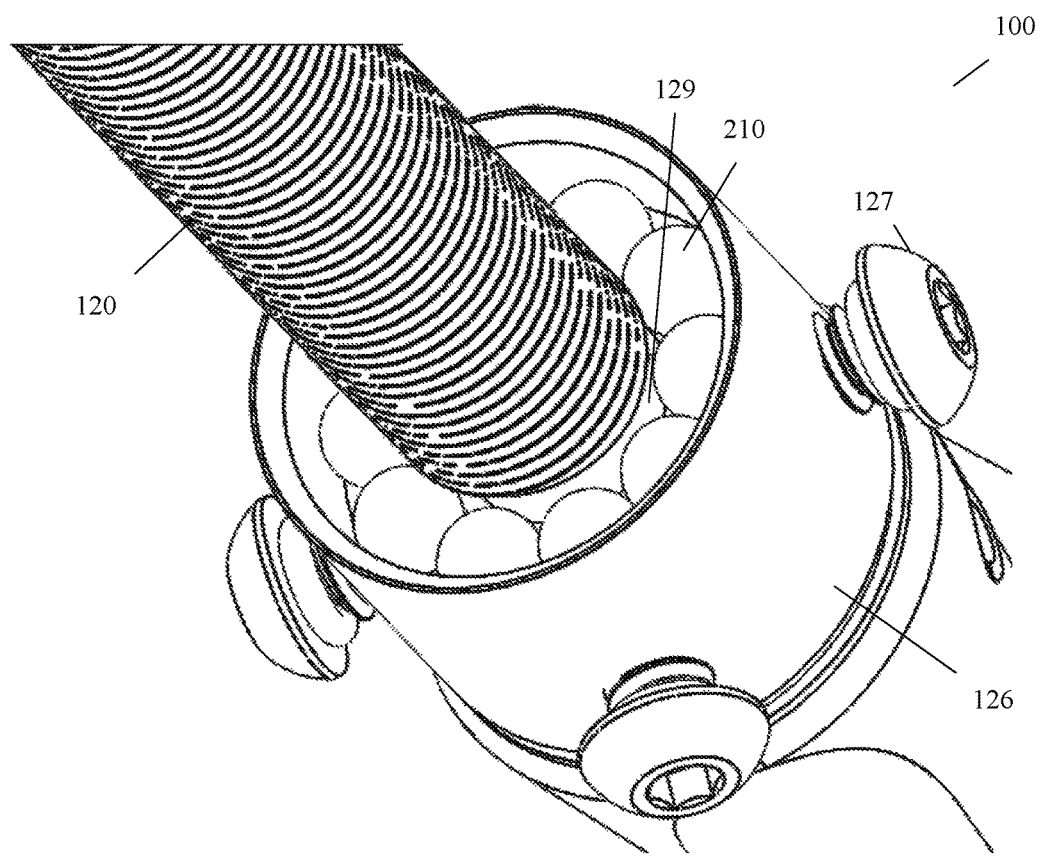
FIG. 12 shows an internal view of bearing balls of an energy absorber, according to an embodiment.

FIG. 12 shows an internal view of bearing balls of a bearing 210 of an energy absorber 100, according to an embodiment. As shown, the bearing balls of the bearing 210 are normally seated in the groove 129 within the bearing housing 126 under no force or any force that is less than the force required to compress the threads of the threaded rod 120.

One or more embodiments include a semi-sealed or sealed housing 105 protecting the internal components from destructive environmental or job site conditions allowing the product to remain in service longer by maintaining the energy absorber 100 to a near new condition. The energy absorber 100 provides single and multi-user energy absorption within the allowable standard forces, and which does not require excessive clear fall distance. The energy absorber 100 embodiments may include an optional tension indicator built directly into the unit avoiding the need for a secondary component to perform this function. One or more embodiments are customizable for using the energy absorber 100 embodiments in vertical life-line (VLL) systems, horizontal life-line (HLL) systems as well as personal fall arrest limiters.

The energy absorber 100 is among the shortest absorbers (length wise) compared to existing energy absorbing systems. In one example embodiment, the length of the energy absorber 100 may be between 4 inches to 30 inches, depending on the application. The energy absorber 100 is versatile product for personal protection equipment (PPE) capable of being used as the energy absorbing element in VLL, HLL as well as personal fall limiters (e.g., lanyards) and self retracting devices (SRD's).

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An energy absorber comprising:
   a housing;
   a bearing housing positioned within the housing;
   a main connection point coupled to a first receiver; and
   a threaded rod coupled through a bearing and having an end coupled to the first receiver at a first end of the housing, the bearing positioned in the bearing housing, wherein compressible elements comprising threads of the threaded rod compress against the bearing, and upon a force acting on the main connection point exceeding a force threshold, the threaded rod is forced past the bearing and out of the first end of the housing as one or more of the compressible elements of the threaded rod are compressed to absorb the force.

2. The energy absorber of claim 1, further comprising a tension spring coupled to a tension rod; and
   a top attachment having a second receiver at a second end of the housing, the second receiver coupled to an end portion of the tension rod.

3. The energy absorber of claim 2, wherein the bearing is positioned in a groove in the threaded rod.

4. The energy absorber of claim 3, wherein the bearing includes bearing balls that press against the threads of the threaded rod.

5. The energy absorber of claim 4, wherein upon a force acting on the top attachment compresses the tension spring, and the tension rod is pulled out of a second end of the housing.

6. The energy absorber of claim 2, wherein the threaded rod includes a force or fall event indicator, and the tension rod includes a tension indicator.

7. The energy absorbing device of claim 2, wherein upon a force acting on the top attachment, the tension spring is compressed and the tension rod is pulled out of a second end of the device housing.

8. The energy absorber of claim 1, further comprising a locking pin that couples through the first receiver and a through hole of the threaded rod;
   wherein the housing is sealed or semi-sealed.

9. The energy absorber of claim 1, wherein the housing includes at least one inspection window.

10. The energy absorber of claim 1, wherein the threaded rod is a threaded bolt, and the first receiver comprises a nut coupled to the main connection point or a threaded housing.

11. An energy absorbing device comprising:
    a device housing including a compression device housing;
    a main connection point coupled to a first receiver; and
    a rod including compressible energy absorbing elements and having an end coupled to the first receiver, wherein the compressible energy absorbing elements comprise threads of the rod that compress against a compression device, and upon a force acting on the main connection point exceeding a force threshold, the threaded rod is forced past the compression device and out of a first end of the device housing as one or more of the compressible energy absorbing elements of the rod are compressed to absorb the force.

12. The energy absorbing device of claim 11, further comprising
    a tension spring coupled to a tension rod; and
    a top attachment having a second receiver at a second end of the device housing, the second receiver coupled to an end portion of the tension rod.

13. The energy absorbing device of claim 12, wherein the rod includes a force or fall event indicator, and the tension rod includes a tension indicator.

14. The energy absorbing device of claim 11, further comprising.a locking pin that couples through the first receiver and a through hole of the threaded rod;
    wherein the device housing is sealed or semi-sealed, and the housing includes at least one inspection window.

15. An energy absorber comprising:
    an energy absorber housing;
    a compression device housing positioned within the energy absorber housing;
    a main connection point coupled to a first receiver;
    a rod coupled through a compression device and having an end coupled to the first receiver at a first end of the energy absorber housing, the compression device positioned in the compression device housing, wherein compressible elements comprising threads of the rod compress against the compression device, and upon a force acting on the main connection point exceeds a force threshold, the rod is forced past the compression device and out of the first end of the energy absorber housing as one or more of the compressible elements of the rod are compressed to absorb the force;
    a tension spring coupled to a tension rod; and a top attachment having a second receiver at a second end of the energy absorber housing, the second receiver coupled to an end portion of the tension rod.

16. The energy absorber of claim 15, further comprising a locking pin that couples through the first receiver and a through hole of the rod;
wherein:
the energy absorber housing is sealed or semi-sealed; and
the energy absorber housing includes at least one inspection window.

17. The energy absorber of claim 16, wherein upon a force acting on the top attachment the tension springis compressed, and the tension rod is pulled out of a second end of the housing.

18. The energy absorber of claim 15, wherein the rod includes a force or fall event indicator, and the tension rod includes a tension indicator.

* * * * *